United States Patent [19]

Civanlar et al.

[11] Patent Number: 5,313,567
[45] Date of Patent: May 17, 1994

[54] ARRANGEMENT FOR DETERMINING AND DISPLAYING VOLUMETRIC DATA IN AN IMAGING SYSTEM

[75] Inventors: M. Reha Civanlar, Red Bank; Steven C. Dzik, Somerset; Yuh-Tay Liow, Edison, all of N.J.

[73] Assignee: AT&T Bell Laboratories, Murray Hill, N.J.

[21] Appl. No.: 714,468

[22] Filed: Jun. 13, 1991

[51] Int. Cl.[5] .............................................. G06F 15/62
[52] U.S. Cl. .................................... 395/124; 395/119; 395/120; 345/138
[58] Field of Search ............... 395/119, 120, 124, 125, 395/126, 129, 132, 164–166, 400, 425; 358/88, 95, 125, 160, 451, 462; 382/9; 345/185, 189, 190, 138

[56] References Cited

U.S. PATENT DOCUMENTS 5,008,752  4/1991  Van Nostrand .................... 358/160
5,140,416  8/1992  Tinkler .............................. 358/95 X

OTHER PUBLICATIONS

Foley et al., Computer Graphics Principles and Practice, pp. 642–643, (1990).
Image Resampling by John A. Eldon and Mehdi Sani, *Advanced Imaging*, Feb. 1990.
Rapid Techniques for the Display and Manipulation of 3-D Biomedical Data by Samuel M. Goldwasser, *Proceedings of the Seventh Annual Conference and Exposition, National Computer Graphics Association*, May 11–15, 1986.

*Primary Examiner*—Heather R. Herndon
*Assistant Examiner*—Almis Jankus
*Attorney, Agent, or Firm*—John A. Caccuro

[57] ABSTRACT

An imaging system apparatus and operating method thereof utilize a volumetric resampling technique with interpolation to determine sample point values on user-defined paths traced through a volumetric image comprising a group of predefined data values, which are themselves samples of a continuous volumetric object. Data values to be displayed are determined from the sample point values using user-selected interpolation and visualization operating modes.

28 Claims, 4 Drawing Sheets

FIG. 5  INTERLEAVED VOLUME MEMORY

ARRANGEMENT FOR DETERMINING AND DISPLAYING VOLUMETRIC DATA IN AN IMAGING SYSTEM

TECHNICAL FIELD

This invention relates to a method and apparatus for determining three-dimensional data for display on a two-dimensional display monitor.

BACKGROUND OF THE INVENTION

The increase in the amount of data needed to be analyzed in medical imaging applications makes the existing manual, plane by plane image analysis method inefficient and, in certain cases, ineffective. This fact combined with the advances in digital image processing hardware and algorithms such as fast volume rendering and temporal image processing that can ease the analysis task have further increased the demand for medical image processing systems. Because of the short processing time and, in most cases, interactivity requirements of medical image processing applications, such systems must have very high performance levels. On the other hand, since such a system is typically an accessory to a host system, the medical image processing system should cost much less than the host system.

New medical image processing system designs are using parallel processors in an attempt to increase data processing speed. However, such systems are expensive and, because many processors are involved, are generally difficult to program by the user. Consequently, there is a continuing need for adaptable image processing systems which have a reduced price/performance ratio.

SUMMARY OF THE INVENTION

An imaging system in accordance with the present invention utilizes a volumetric resampling technique with interpolation to determine the value of all sample points on user-defined paths (having programmable locations, shapes and sampling step sizes) cast through a volumetric image comprising a group of predefined data values, which are themselves samples of a continuous volumetric object.

More specifically, the volumetric resampling method and apparatus of the present invention interpolates data values for sampling points on any arbitrary path described through a group of predefined data values which are arranged in an $M(M \geq 3)$ dimensional Cartesian coordinate system with no missing intermediate data values. In response to a user input, a path is described including a sequence of sampling points through said group of data values. The user also selects an operating dimension $N(N \leq M)$ which determines the interpolation mode. Depending on the selected dimension N, a data value for each sampling point is interpolated using $2^N$ neighboring data values which have been accessed from said group of data values. An additional feature enables data values to be displayed which are determined from sampling point values using a user-selected visualization operating mode.

According to another aspect of the present invention, a storing means stores the group of predefined data values in a plurality of memory banks so that no data value has a neighboring data value which is stored in a memory bank which is the same as its memory bank. The storing means is arranged so that all of the memory banks can be accessed simultaneously, thereby significantly increasing the speed of the apparatus.

DETAILED DESCRIPTION

Figure 1:
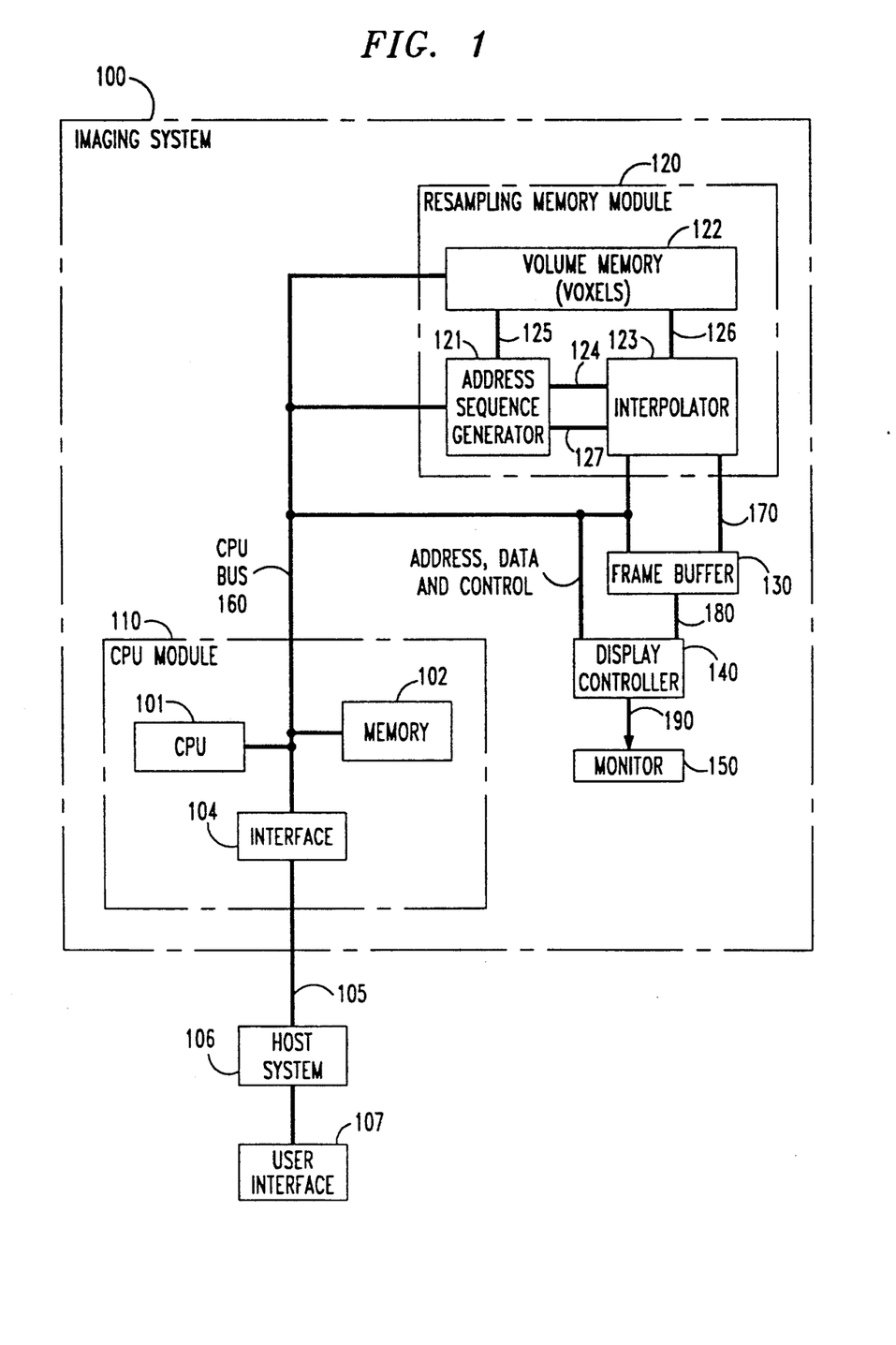
FIG. 1 shows an illustrative block diagram of an imaging system in accordance with the present invention.

The imaging system 100 of FIG. 1, in accordance with the present invention, includes central processing unit (CPU) module 110, resampling memory module 120, frame buffer 130, display controller 140 and monitor 150. The CPU module 110 communicates via CPU bus 160 (including address and data buses) with resampling memory module 120, frame buffer 130 and display controller 140. The CPU module 110 includes a CPU 101, and memory 102 for storing the programs necessary to implement the present image processing system and for storing data used by the program, and interface 104 for interfacing, over bus 105, to a host computer and/or other systems 106 which communicate with the system. The user, via user interface 107 to the host system 106, may select a path, from a group of predefined paths provided by the system, or may specify path defining coefficients. The user may also select whether two or three-dimensional interpolation is desired by the system. The host or other system 106 may be, for example, a medical image system which provides the two-dimensional (2-D) or three-dimensional (3-D) images which are to be further analyzed by the present invention. The system 106 may also be a replica of the imaging system 100, with the exception of the display controller and the monitor. The combination of host system 106 and multiple imaging systems 100 results in an increase in the memory size and the computational power. If more than one system is used, each of them processes its share of volumetric data independently and the first system CPU merges the resulting two-dimensional images to obtain the final image according to the particular rendering algorithm programmed in each system CPU 101.

CPU module 110 may, illustratively, be implemented using an AMD 29050 microprocessor (CPU 101) and appropriate Static Random Access Memory (SRAM) and Dynamic Random Access Memory (DRAM) to obtain the desired performance required by the system. The interface 104 may include a VME bus interface for a host computer such as a SUN workstation and a bidirectional first-in-first-out (FIFO) register for the two CPU systems.

The resampling memory module 120 includes special purpose hardware to implement volume memory 122, address sequence generator 121 and interpolator 123. Volume memory 122 communicates with address sequence generator 121 over bus 125. Address sequence generator 121 communicates with interpolator 123 over busses 124 and 127. Interpolator 123 communicates with volume memory 122 over bus 126 and communicates with frame buffer 130 over bus 170. The operating characteristics of the special purpose hardware for each unit of resampling memory module 120 are described in detail in later paragraphs.

The imaging system 100 may be used, for example, to produce digital images for medical imaging modalities such as computerized tomography (CT), magnetic resonance imaging (MRI), positron emission tomography (PET) and digital radiography. Most of these modalities produce three-dimensional (volumetric) images of the human body in the form of multiple two-dimensional images (planes) which are commonly referred to as slices. As imaging technology advances, the number of slices used in a single study, as well as the resolution of the individual slices, increases. Currently, for MRI 128 256×256 pixel slices and for CT 64 512×512 pixel slices are considered to be common study sizes. Also, techniques to acquire time sequence images, for example images of a beating heart, are becoming extremely useful tools for the diagnostic imaging world and several seconds of such sequences may contain hundreds of slices or images which can be considered as a volumetric data set whose third dimension is time.

Additionally, imaging systems that display three-dimensional data economically and effectively are of interest in a variety of other applications including: electron microscopy, confocal microscopy, non-destructive testing, fluid flow, seismic, and remote sensing.

Because of the increase in the amount of data needed to be analyzed by imaging systems, because of the short processing time, and the typical interactivity requirements of certain image processing applications, such imaging systems must have very high performance levels.

An imaging system in accordance with the present invention utilizes a volumetric resampling technique with interpolation to obtain all the points on rays (with programmable locations and shapes) cast through a volumetric image. The system may provide the following user-selectable visualization operating modes at interactive video rates.

Cine-loop displays with interactive zoom, scale, and warping adjustments for image sizes up to 1K×1K pixels.

High quality (trilinear interpolation) multi-planar reformatting (MPR) of three-dimensional data on arbitrary oblique or curvilinear surfaces.

Interactive volumetric visualization using maximum intensity projection (MIP) technique.

Extremely fast rendering of volume data using other ray-casting-based rendering techniques such as additive projections, integral shading and other user-defined methods where the samples on the cast ray are stored in the frame buffer and processed by the CPU to determine the displayed pixel intensity.

A brief description of three well-known processing algorithms which perform the above functions or operations is given below. These operations are zoom, multi-planar reformatting (MPR), and maximum intensity projection (MIP). Understanding these algorithms will help provide insight into the architecture and features provided by the present system.

The present system has the capability to "play back" a Cine-loop with real time zoom. The Cine-loop may be a precomputed series of views of a three-dimensional data base or a single view type of many data bases showing motion with time. It may be unacceptable for the zoom operation to be performed with pixel replication. Therefore, every output value should be interpolated based upon the appropriate source data. The most common interpolation technique is called bilinear interpolation. In bilinear interpolation every output pixel is computed based upon the value of the four source values surrounding the mapped output point. Each of the four source values is given a weight corresponding to the location of the output point with respect to the four source locations. The weight for each source point is proportional to the area of a rectangle defined by the output point and the source point diagonally across the source point for which the weight is being determined. After multiplying each source by its corresponding weight the four resultants are summed to produce the output pixel value.

Another typical rendering technique is called multiplanar reformatting (MPR). A plane or curved surface is used to cut the source volume. Sampled points are selected on some regular grid upon this surface. At each of the sampled points, the nearest eight source values forming a cube around the sampled point are used to calculate the output value at that grid point. Using trilinear interpolation algorithm, each of the eight values is weighted similar to the bilinear interpolation case by replacing the rectangle with a parallelepiped and determining its volume. The plane or curvilinear surface used to cut the volume can be at any orientation with respect to the volumetric data base and it is often desirable to change the orientation or move the cut surface in an interactive fashion.

A third typical rendering technique is called maximum intensity projection (MIP). In this algorithm, grids of rays are cast through the volumetric database. At a preselected sampling distance along each ray either a trilinear interpolated value is computed or a nearest neighbor source value to the ray grid is found. Each of these values is compared against all other values computed along the ray and the maximum intensity point is found. That value then becomes the output pixel intensity.

Each one of the operations described above may be utilized with the nearest neighbor or linear interpolation mode.

In order to display a desired picture on an imaging console from a three-dimensional data base three operations are needed. First, a mapping of locations within the output display memory to locations within the volumetric data base locations must occur. For this, some transformation equation must be set up which calculates a source input location for every output location. This mapping may be a three-dimensional to three-dimensional (3-D) mapping as in the MIP algorithm; it may be a three-dimensional to two-dimensional (2-D) mapping with one dimension in the output not traversed as in MPR; or it may be a two-dimensional to two-dimensional mapping as in zoom operations. This address mapping function is supported by the address sequence generator 121.

Second, since this mapping function rarely produces grid points that match exactly the source data locations, some interpolation rule or mode must be used to obtain the desired data value from the neighboring predefined data values and the integer and fractional addresses. For example, using the nearest neighbor rule, the predetermined data value closest to the desired location is used.

The interpolation is carried out by the interpolator 123 which can be implemented using multipliers and adders.

Third, the set of data values obtained from steps one and two is then combined through some algorithm to produce the desired output. This may be the use of the single value directly as with MPR where only one value per output pixel is obtained. In MIP, of course, the maximum of many values is selected as the output. This can be taken care of by using a hardware comparator at the output of the interpolator.

With reference to FIG. 1 again, we describe the operation of the various units of the resampling memory module 120 which includes volume memory 122, address sequence generator 121, and interpolator 123. Imaging and volumetric-based display systems typically need a very large volume memory 122. Note, the volume memory 122 may be provided separately from the rest of the imaging system of FIG. 1 and accessed via the various busses 160, 125 and 126. The present standard for ensuring that sufficient memory is available in medical imaging is to provide for at least $256 \times 256 \times 256$ volumetric image. Since each volume or source element (voxel) is stored using 16 bits, at least 32 megabytes of storage are needed. New imaging devices may soon produce even higher resolutions such as: $512 \times 512 \times 128$. Since it is not cost effective to implement these memories using fast memory devices, slow dynamic ram has always been the memory of choice for these applications.

In a first embodiment, a system is designed with only a single bank volume memory 122 and every volume element is accessed only once but sequentially using dynamic random access memory (DRAM) devices. Assuming $256 \times 256 \times 256$ memory size and 150 nsec. cycle time, this operation requires approximately two and a half seconds.

Today, bilinear and trilinear interpolation are two of the most commonly used techniques in display algorithms. To handle bilinear and trilinear interpolation, as well as to speed up sequential memory accesses, a second embodiment of volume memory 122 (shown in FIG. 5) is interleaved in such a fashion that four adjacent elements of an image or eight adjacent elements of a volumetric image can be accessed simultaneously. Using an eight-way interleaving scheme, access time can be significantly reduced.

Figure 5:
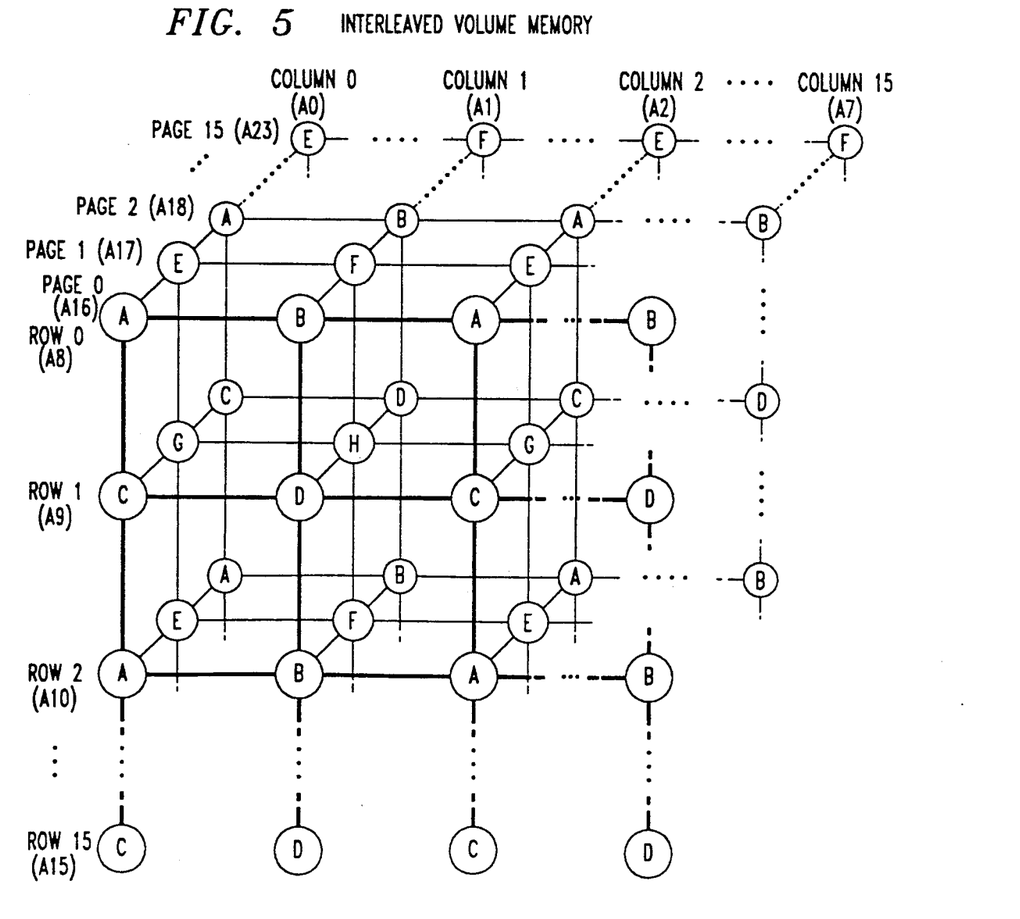
FIG. 5 shows an interleaved memory structure which may be utilized with the present invention.

The present system controls the memory bandwidth bottleneck by interleaving the memory devices of volume memory 122 such that algorithms which need to access adjacent data values can access all the data in one memory access cycle. Shown in FIG. 5 is a second embodiment of volume memory 122 constructed as an interleaved volume memory. Note that the voxels A–D form a repeating pattern in each even number page along both the rows and columns thereof. The voxels E–H also form a repeating pattern in odd number pages along both the rows and columns thereof. The interleaved volume memory 122 is comprised of many such pages (typically one page per slice).

The images (2-D or 3-D) to be processed are stored in volume memory 122 formed by eight interleaved memory banks, namely bank A to bank H. Note, in the interleaved volume memory 122, all of the A memory elements are stored together in one memory bank or unit, designated A in volume memory 122. Similarly, all the other memory elements B through H are stored in different memory banks of interleaved volume memory. When an address associated with each sample point is given to the interleaved volume memory, each memory bank is arranged to determine if the sample point address is for it. Thus, memory bank A, for example, responds only to sample points addressed to it.

As shown in FIG. 5, a 3-D image stored in the volume memory is evenly distributed among all eight banks. Note a 3-D image can be treated as 2-D images with identical size in X and Y directions. Banks A, B, C, D store the 2-D images with even page-address components and banks E, F, G, H store those with odd page-address components. Each 2-D image is evenly distributed among banks A, B, C, D or E, F, G, H. A 3-D image is treated as consecutive 2-D images when it is stored in volume memory 122. For each 2-D image, pixels in the sae row are stored in consecutive memory locations between banks A and B, C and D, E and F or G and H. Assume volume memory 122 consists of 32 Mbytes of dynamic RAM. It can accommodate up to 16 million 16-bit pixels (picture element data value for 2-D displays) or voxels (volume element data value for 3-D displays) and it requires, therefore, 24 address bits to access the volume memory.

An interleaved volume memory can generally be arranged so that by permuting the memory banks, no two adjacent voxels are stored in the same memory bank. Thus, in the example of FIG. 5, for any given voxel all of the surrounding nearest adjacent voxels reside in different memory banks and the memory access time is decreased by a factor of at least two, assuming the sampling step size is less than or equal to the inter-voxel distance. Moreover, if all the surrounding next adjacent voxels (i.e., those next to the adjacent voxels) can also be made to reside in different memory banks, then the total access time to obtain multiple sample points from memory is decreased by a factor of at least three, assuming the sampling step size is less than or equal to the inter-voxel distance.

Figure 2:
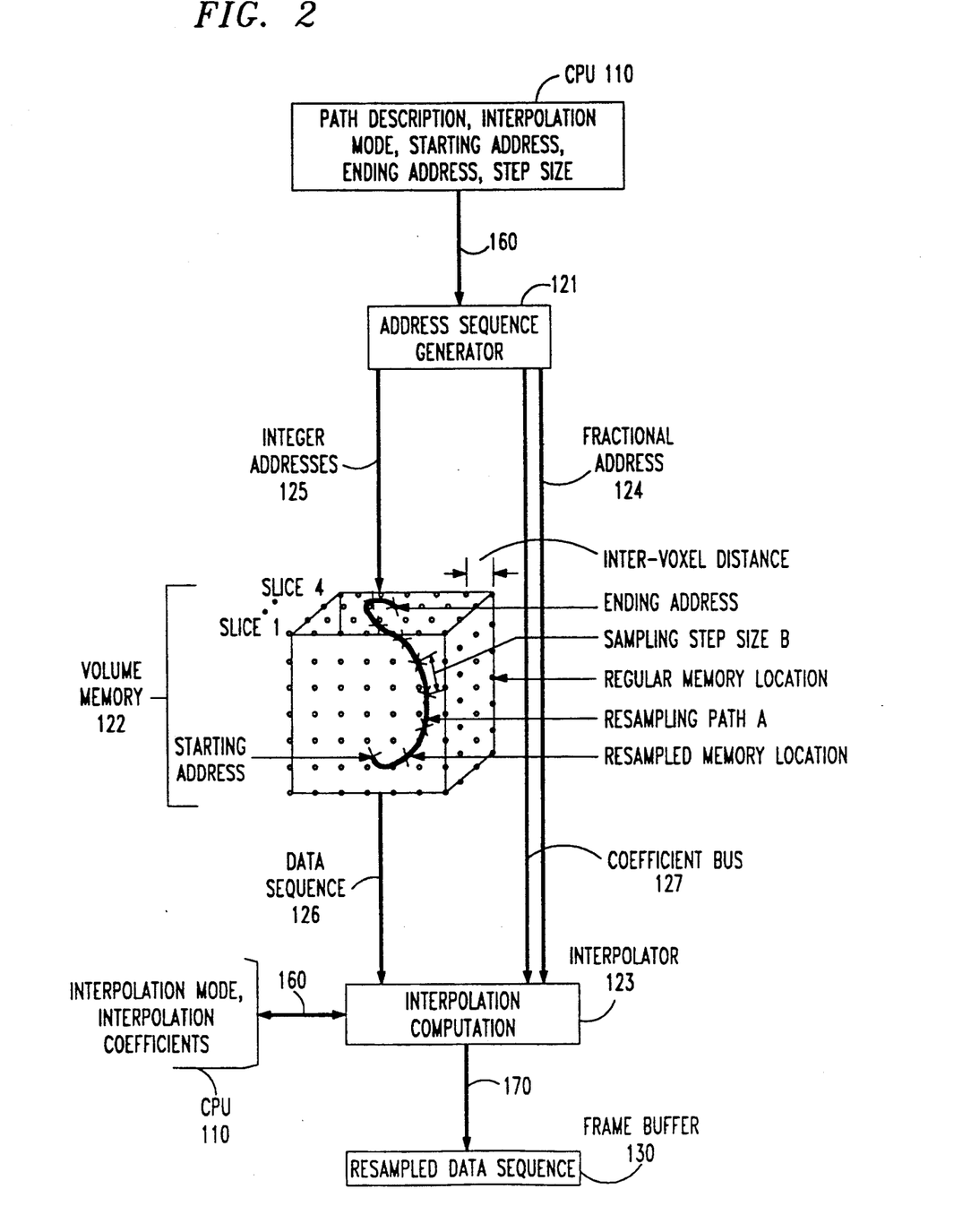
FIG. 2 shows a more detailed block diagram of the resampling memory module of FIG. 1.

With joint reference to FIGS. 1 and 2, data stored in volume memory 122 can be accessed by CPU 101 or address sequence generator 121, however, its contents can only be updated by CPU 101. The address of volume memory 122 can be divided into three fields, namely page, row and column, driven by the respective source address fields generated by address sequence generator 121. Depending on the size of the images stored in volume memory 122, each address field contains different numbers of bits. For example, to ensure a 2-D $256 \times 256$ image occupies an entire page formed by banks A, B, C, D or E, F, G, H, the column field contains address bits $A_0$ to $A_7$ while the row field contains $A_8$ to $A_{15}$ The rest of the address bits ($A_{16}$ to $A_{23}$) go to the page field. For images with a size $512^2$, the column field contains bits $A_0$ to $A_8$, row field contains $A_9$ to $A_{17}$ and page field contains $A_{18}$ to $A_{23}$. Address sequence generator 121 in FIG. 1 can interpret the source address bus in three different modes for volume memory 122 to support page sizes $256^2$, $512^2$ and $1024^2$. Images smaller than $256^2$ are filled with holes at the right and lower portions and are stored in $256^2$ mode.

Volume memory 122 can be accessed by the on-board CPU or address sequence generator 121 in both random access mode and the sequential access (page) mode. However, the output of volume memory 122 (data sequence 126) goes to interpolator 123 if the integer address 125 is provided by the address sequence generator 121. The address sequence generator 121 also generates fractional address 124. Volume memory 122 may be accessed by the address sequence generator 121 using a parallel or serial data stream depending on the operation.

According to another aspect of the present invention, volume memory 122 may include a cache memory, for saving data values associated with the immediately-preceding memory access request, and a comparing means which compares memory addresses between the next sample point and the previous sample point. When the comparing means indicates that the memory addresses are the same, volume memory 122 uses the same sample point value thereby saving the time required for an additional memory access. When the memory addresses are different memory access proceeds as previously described.

Figure 4:
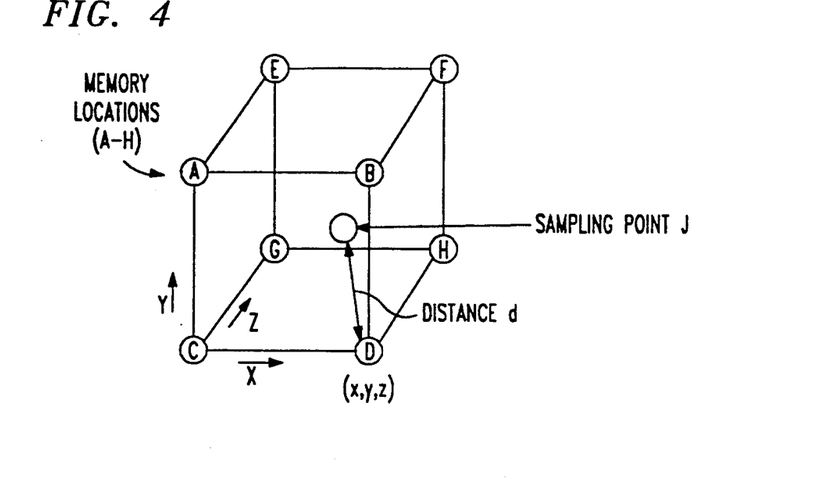
FIG. 4 shows a sampling point and its distance from the vertices of an enclosing volume element.

FIG. 4 illustrates in more detail how the distance between a sampling point J of a resampling path A (of FIG. 2) and a voxel location of an enclosing volume is determined. The enclosing volume shown in FIG. 4 includes vertices A, B, C, D, E, F, G and H. The volume of the parallelepiped whose principal diagonal is the distance d shown in FIG. 4 is the interpolation coefficient for the voxel at vertex E. The interpolation coefficients for other vertices can be determined similarly. Then, each of the eight voxels is multiplied by its respective interpolation coefficient and the resultants are summed. The interpolation coefficients are weighted so that their sum is one. The size of each parallelepiped as well as the weighting are determined by the interpolator 123 using the fractional address generated by the address sequence generator 121. Interpolation coefficients for 2D bilinear interpolation can be determined similarly by replacing the parallelepiped by a rectangle.

Since each sample point J in the volumetric space is considered to have eight surrounding voxel locations (A-H) and since these reside, respectively, in different memory devices, in volume memory 122, all eight values for a trilinear interpolation operation can be accessed simultaneously. It is not possible, however, to always access these data elements with the same address. For some locations in memory, every surrounding voxel element may need a different address. Some voxel elements may need to have the column portion of their address incremented by one. Others may need to have their row or page address component incremented by one. Therefore, in order to utilize this interleaved memory structure each bank of memory must be able to access its data at a different address from every other bank of memory. The address sequence generator 121 provides eight separate address busses (part of bus 125) to memory banks A-H in order to utilize the interleaved memory structure. These addresses are provided simultaneously to insure maximum system performance.

With reference to FIG. 2, address sequence generator 121 basically uses information (e.g., path description, starting address, ending address and step size) provided by CPU module 110 to trace a set of paths (one such path is shown by A in FIG. 2) through the volume memory elements. Address sequence generator 121 supports 2-D and 3-D transformations or mapping functions such as image resampling, rotation, scaling, and warping between source and target data. In a typical implementation of the address sequence generator 121 (based on TRW's TMC 2302 resampler), the address sequence generator is divided into three-sub modules corresponding to the address generation in X, Y, and Z axes respectively. Each sub-module generates two sets of address busses, namely, source address bus 125 and coefficient address bus 127. The source address bus determines the address of the data to be fetched from volume memory 122 while the coefficient address bus is used for 1-D or 2-D walk counter in traversing a 2-D or 3-D kernel. The source address bus contains two parts: integer address that is directly used to access voxels (or pixels for 2-D) stored in volume memory and fractional address that is used to determine the sizes of sub-volumes for interpolation coefficients. In a bilinear or trilinear interpolation mode, only the fractional address (through 124) is used by interpolator 123 to calculate interpolation coefficients. In other interpolation modes with a larger interpolation kernel, both coefficient address (through 127) and fractional address (through 124) are used by interpolator to calculate interpolation coefficients because coefficient address bus 127 is used as a walk counter to traverse a 2-D or 3-D kernel. In the described implementation, CPU 101 originates the target address which is then automatically increased in a sequential manner.

As previously noted, the address sequence generator 121 may access data in either parallel or serial mode, depending on the interpolation mode. In other words, data sequence on bus 126 may be received by interpolator 123 in either a parallel or a serial stream. In bilinear and trilinear interpolation modes the size of the kernel is four and eight respectively, and thus address sequence generator 121 performs a parallel data access to volume memory 122. That is, in the bilinear (trilinear) mode, four pixels (eight voxels) are fetched from volume memory 122 at the same time. For other interpolation kernels or nearest-neighbor mode, only one pixel (or voxel) at a time is fetched. Address sequence generator 121 includes a walk counter to traverse all pixels in a 2-D or 1-D kernel sequentially. For 1-D or 2-D interpolation, this feature can be directly applied to traversing pixels in the kernel in a single pass. For 3-D interpolation with a kernel larger than that of trilinear mode, if the interpolation is separable, walking through the kernel can be accomplished by performing a 1-D, z-direction walk, on the intermediate results of 2-D interpolated planes.

If the source image address received from CPU 101 is in X, Y, Z space and the destination image is addressed in U, V, W space, then the address generator 121 calculates the X, Y, Z coordinates for each U, V, W element in the output space. For a maximum intensity projection (MIP) implementation, the screen of monitor 150 is represented by the V, W page, and elements, if there are more than one along the U axis, are combined by the maximum selection algorithm to produce the desired output image.

On each clock cycle, the address sequence generator 121 steps through a single element of the U, V, W box selected by the user, calculates the X, Y, Z coordinates mapped to that location and outputs the X, Y, Z coordinates. On the next clock cycle, the sequencer either increments U, resets U and increments V, or resets U, and V and increments W depending on the user-specified limits. (That is, the starting point and ending points are defined by the U, V, W output coordinates).

The mapping of source-to-destination is user-controlled by the specification of the coefficients of the following multi-dimensional parametric equations:

$$X = a0 + (b0*U) + (c0*V) + (d0*W) + (e0*U*V) +$$
$$(f0*V*W) + (g0*U*V) + (h0*U*V*W)$$

$$Y = a1 + (b1*U) + (c1*V) + (d1*W) + (e1*U*V) +$$

$$\quad (f1^*V^*W) + (g1^*U^*V) + (h1^*U^*V^*W)$$
$$Z = a2 + (b2^*U) + (c2^*V) + (d2^*W) + (e2^*U^*V) +$$
$$\quad (f2^*V^*W) + (g2^*U^*V) + (h2^*U^*V^*W)$$

Note, the coefficients a0-h0, a1-h1, a2-h2 define the resampling path A of FIG. 1. These parameters may be provided by the host or may be selected by the user from a predefined set of resampling paths previously stored in the imaging system. For example, the system may store a variety of resampling paths, such as a straight line path having different starting points and directions. Moreover, the path can describe a plane or curved surface which can then be displayed on monitor 150.

While the present invention has been described for use with three dimensional variables (X, Y, Z) it should be understood that the techniques may be extended to greater numbers of dimensions. For example, the fourth dimension could be added to the transformation equation set in a straightforward extension of the described approach. Moreover, while the present invention has been described for use in a three-dimensional Cartesian coordinate system, it can be extended, in a straightforward manner, for use in any multi-dimensional Cartesian coordinate system. However, it should be noted that if the group of predefined data values is arranged in an M(M≧3) dimensional Cartesian coordinate system, the user may then select any operating dimension N (N less than or equal to M) which specifies the level of interpolation required.

In an illustrative implementation (based on TRW's TMC 2302 resampler), each coefficient of the above-described multi-dimensional parametric equations is programmed in 48-bit fixed point and each X, Y, Z is computed in 48-bit fixed-point format. The image sequencing fixed-point format selected for the computation of source image components is 16 bits of integer address and 32 bits of fraction. This provides error-free address computation over any practical image size. In addition, the area of interest for the address mapping is user-specified by programming "min" and "max" values for U, V, W. The images sequencing hardware computes a source address in 48-bit fixed-point format every clock cycle. The address computed is a user-specified transform from each destination pixel or voxel to a source coordinate. The image sequencer outputs for each address a page, row, and column component each of which contains a 16-bit address and 8 bits of subpixel resolution. The address is used to access the data values for the computation while the subpixel addressing may be used to attach a weight to each data value. This is useful for all interpolation algorithms. The one address per clock cycle provides extremely efficient addressing capability for image and volumetric processing.

Interpolator 123 basically uses the data output of address sequence generator 121 and CPU 101 provided coefficients to compute a resampled data sequence as described in more detail below.

As described above, the address sequence generator 121 calculates a source address for every destination pixel in the display. This source address often contains a fractional address or displacement from the finite locations in the source memory. Many display algorithms require that the nearest of these points be used as the data value obtained from this mapping. This technique often produces noticeable anomalies in the output display.

The address sequence generator 121 generates the address of all the voxel or pixel elements surrounding the mapped location. The volume memory 122 includes a control circuit which uses the least significant bit of the integer portion of the X, Y, Z addresses to determine if some of the memory bank addresses need to have their X, Y, or Z elements incremented. When the system is in trilinear interpolation mode, all eight address busses output may contain a different address. Each memory block bus contains a valid flag that signifies that this is a valid address to its corresponding memory controller. In bilinear interpolation mode, there can be only four distinct addresses and based on the least significant Z bit, the appropriate four memory controllers receive valid address flags. In nearest neighbor mode the valid flag is only asserted for the appropriate memory controller.

Images and volumes are not always limited to 256 elements in each direction. The present system allows the user to handle a variety of image sizes. When using image dimensions of 256 elements or less, the entire image fits within a subsection of the source volume and the interleaving is unaffected. If the user desires to store 512×512 or 1K×1K images or even a 512×512×64 volume in the source memory the system has to account for the greater dimensions. The bilinear and trilinear address generation circuitry can be set up by the system to access the memories in either 256, 512 or 1K format. In each case, the appropriate number of bits of the X, Y, and Z address field are used and the address is shifted and concatenated to present a linear address to volume memory 122.

Figure 3:
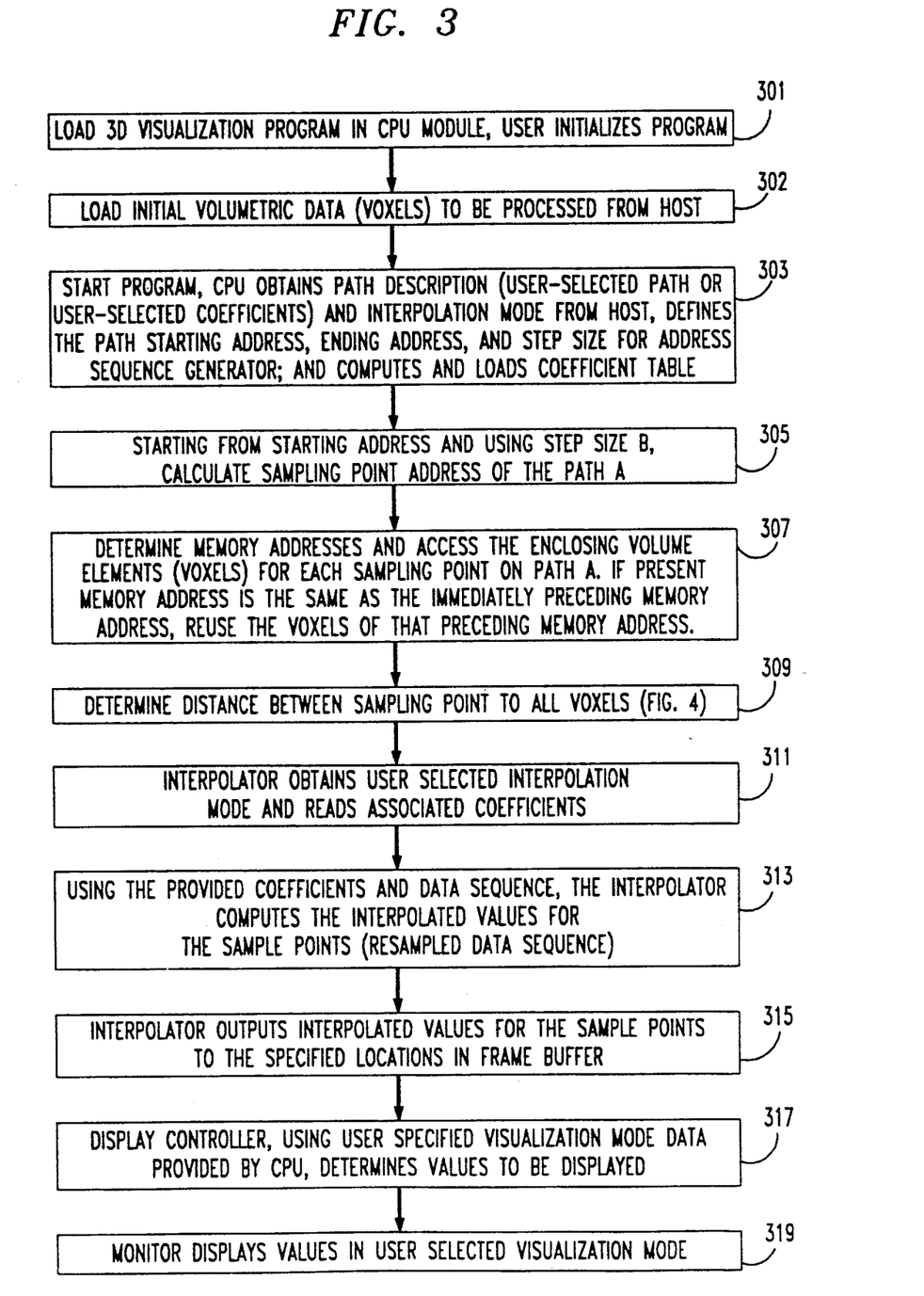
FIG. 3 shows a flow chart describing the operation of the system of FIG. 1 in accordance with the present invention.

With joint reference to FIGS. 2 and 3 we will describe the interactions of the various previously-described units of FIG. 1 in performing the operations of the present invention. In step 301, CPU module 110 loads a 3D-visualization program including user initialization of various parameters therein. The user specifies a particular interpolation mode (e.g., N equal to 2D or 3D) and corresponding coefficient tables, an image display location, and a visualization mode when the system is initialized. In response to a user input, an application program specifies a path description, starting address, ending address and step size to CPU 101.

In step 302, CPU module 110 loads the initial volumetric data to be processed from the host system 106. The volumetric data is represented by the two-dimensional images, shown as slices 1-4 of FIG. 2. As previously noted, this data is received via a host or other system via facility 105 and interface 104. In step 303, the program is started and CPU 101 obtains the path description and interpolation mode from the application program and defines the path starting address, ending address and step size B which is provided to address sequence generator 121 as shown in FIG. 2. As previously noted, the user may define the path to be used by selecting from a group of prestored paths or by specifying coefficients which define a path. CPU 101 also computes and loads the coefficient table (not shown).

In step 305, the address sequence generator 121 starting from the path starting address and using step size B calculates sampling point addresses along the resampling path A of FIG. 2. In step 307, address sequence generator 121 determines memory locations of the enclosing volume elements (voxels) for each sampling point on path A. This was previously described with reference to FIG. 4 In step 309, address sequence generator 121 determines the integer and fractional addresses for the sampling point. (this is shown in detail for a sampling point J in FIG. 4).

In step 311, interpolator 123 obtains the user-selected interpolation mode and reads the associated coefficients from the coefficient tables. Interpolator 123 uses the data sequence 126 received from volume memory 122 and computes the interpolated values for the sample points (resampled data sequence). In step 315, interpolator 123 outputs the interpolated values for the sample points to the specified locations in frame buffer 130. In step 317, the CPU 101 or special purpose hardware uses the user-specified visualization operating mode data to determine the interpolated values, such as the maximum value, to be displayed. In step 319, monitor 150 displays the selected data value provided by display controller 140.

What has been described is merely illustrative of the application of the principles of the present invention. Other arrangements and methods can be implemented by those skilled in the art without departing from the spirit and scope of the present invention.

We claim:

1. Computing apparatus for determining an arbitrary sequence of data values from a group of predefined data values, said apparatus comprising
    means for storing said group of predefined data values, arranged in an M (M≧3) dimensional Cartesian coordinate system, said storing means including a plurality of memory banks which are arranged to store said group of predefined data values such that no predefined data value has a neighboring predefined data value which is stored in a memory bank which is the same as its memory bank, said storing means being so arranged that all of said plurality of memory banks can be accessed simultaneously, said storing means further including
    cache memory means for saving data values associated with an immediately preceding memory access request and
    means for comparing a memory address of a current memory access request with a memory address of said immediately preceding memory access request;
    means for selecting an operating dimension N (N≧1) which is less than or equal to M;
    means for describing a path including an arbitrary sequence of sampling points through said group of predefined data values, said path describing means including
    means for defining the starting point, ending point shape and sampling step size of said path in response to a user input, and
    means responsive to said defining means for calculating a memory address of each sampling point;
    means for simultaneously accessing said storing means, for each sampling point value to obtain, $2^N$ neighboring predefined data values using the memory address for each sampling point; and
    means, responsive to said selected dimension N, for interpolating a value for one or more sampling point values using $2^N$ neighboring predefined data values accessed from said storing means.

2. The apparatus of claim 1 wherein for N equal to two, said interpolator means performs a two-dimensional bilinear interpolation using four neighboring predefined data values.

3. The apparatus of claim 1 wherein for N equal to three, said interpolator means performs a three-dimensional trilinear interpolation using eight neighboring predefined data values.

4. The apparatus of claim 1 including
    a plurality of prestored paths and wherein said apparatus enables a user to select one of said prestored paths for use by said describing means.

5. The apparatus of claim 1 wherein the describing means includes a plurality of coefficients of a multi-dimensional parametric equation selectable by a user for describing said path.

6. Apparatus of claim 1 further comprising
    means for displaying one or more display data values, each display data value determined using one or more of said sampling point values.

7. The apparatus of claim 6 wherein said displaying means utilizes a visualization operating mode including a Cine-loop with geometric manipulation.

8. The apparatus of claim 6 wherein said displaying means utilizes a visualization operating mode including multi-planar reformatting on arbitrary surfaces.

9. The apparatus of claim 6 wherein said displaying means utilizes a visualization operating mode including maximum intensity projection.

10. The apparatus of claim 6 wherein said displaying means utilizes a visualization operating mode including ray-casting-based rendering.

11. A method of operating a computer apparatus for determining an arbitrary sequence of data values from a group of predefined data values arranged in an M(M≧3) dimensional Cartesian coordinate system comprising the steps of
    storing said group of predefined data values in a plurality of memory banks such that no predefined data value has a neighboring predefined data value which is stored in a memory bank which is the same as its memory bank;
    selecting an operating dimension N (N≧1) which is less than or equal to M;
    in response to a user input, describing a path including an arbitrary sequence of sampling points through said group of predefined data values, said path including the steps of
    defining the starting point, ending point, shape and sampling steps size of said path in response to a user input, and
    calculating in response to said defining step a memory address for each sampling point;
    simultaneously accessing said group of predefined data values, using said memory addresses, to obtain $2^N$ neighboring predefined data values for each sampling point, and
    interpolating said accessed predefined data values to determine a sampling point value for one or more sampling points.

12. The method of claim 11 wherein for N equal to two, said interpolating step performs a two-dimensional bilinear interpolation using four neighboring predefined data values.

13. The method of claim 11 wherein for N equal to three, said interpolating step performs a three-dimensional trilinear interpolation using eight neighboring predefined data values.

14. The method of claim 11 wherein said describing step includes a plurality of prestored paths and wherein a user is enabled to select one of said prestored paths for use by said describing step.

15. The method of claim 11 wherein said describing step enables a user to select a plurality of coefficients of a multi-dimensional parametric equation for describing said path.

16. A method of claim 11 further comprising the step of displaying one or more display data values, each display data value determined using one or more of said sampling points.

17. The method of claim 16 wherein said displaying step utilizes a visualization operating mode which is one of a group of operating modes including Cine-loop, multi-planar reformatting (MPR), maximum intensity projection (MIP), and ray-casting-based rendering, and wherein said visualization operating mode is made operable using a prestored processing algorithm and a preselected path.

18. Computing apparatus for determing an arbitrary sequence of data values from a group of predefined data values, said apparatus comprising
means for storing said group of predefined data values, arranged in an M(M≧3) dimensional Cartesian coordinate system, said storing means including a plurality of memory banks which are arranged to store said group of predefined data values such that no predefined data value has a neighboring predefined data value which is stored in a memory bank which is the same as its memory bank, said storing means further including
cache memory means for saving data values associated with an immediately preceding memory access request and
means for comparing a memory address of a current memory access request with a memory address of said immediately preceding memory access request;
means for describing a path including an arbitrary sequence of sampling points through said group of predefined data values, said path describing means including
means for defining the starting point, ending point shape and sampling step size of said path in response to a user input, and
means responsive to said defining means for calculating a memory address of each sampling point;
means, using a nearest neighbor interpolation rule, for accessing said storing means to access the nearest predefined data value for each sampling point and when a sampling step size is less than or equal to the distance between adjacent predefined data values, said cache memory means is accessed to obtain multiple sampling points.

19. The apparatus of claim 18 including
a plurality of prestored paths and wherein said apparatus enables a user to select one of said prestored paths for use by said describing means.

20. The apparatus of claim 18 wherein the describing means includes a plurality of coefficients of a multi-dimensional parametric equation selectable by a user for describing said path.

21. Apparatus of claim 18 further comprising
means for displaying one or more display data values, each display data value determined using one or more of said sampling point values.

22. The apparatus of claim 21 wherein said displaying means utilizes a visualization operating mode including a Cine-loop with geometric manipulation.

23. The apparatus of claim 21 wherein said displaying means utilizes a visualization operating mode including multi-planar reformatting on arbitrary surfaces.

24. The apparatus of claim 21 wherein said displaying means utilizes a visualization operating mode including maximum intensity projection.

25. The apparatus of claim 21 wherein said displaying means utilizes a visualization operating mode including ray-casting-based rendering.

26. A method of operating a computing apparatus for determining an arbitrary sequence of data values from a group of predefined data values, comprising the steps of
storing said group of predefined data values, arranged in an M(M≧3) dimensional Cartesian coordinate system, in a storing means, said storing means including a plurality of memory banks which are arranged to store said group of predefined data values such that no predefined data value has a neighboring predefined data value which is stored in a memory bank which is the same as its memory bank, said storing step including the steps of
saving, in a cache memory means, data values associated with an immediately preceding memory access request and
comparing a memory address of a current memory access request with a memory address of said immediately preceding memory access request;
describing a path including an arbitrary sequence of sampling points through said group of predefined data values, including defining the starting point, ending point shape and sampling step size of said path in response to a user input, and calculating a memory address of each sampling point;
accessing using a nearest neighbor interpolation rule, said storing means to obtain the nearest predefined data value for each sampling point and when a sampling step size is less than or equal to the distance between adjacent predefined data values, accessing said cache memory means to obtain multiple sampling points.

27. Computing apparatus for determining an arbitrary sequence of data values from a group of predefined data values, said apparatus comprising
means for storing said group of predefined data values, arranged in an M(M≧3) dimensional Cartesian coordinate system, said storing means including a plurality of memory banks which are arranged to store said group of predefined data values such that no predefined data value has a neighboring predefined data value which is stored in a memory bank which is the same as its memory bank, said storing means being so arranged that all of said plurality of memory banks can be accessed simultaneously, said storing means further including
cache memory means for saving data values associated with an immediately preceding memory access request and
means for comparing a memory address of a current memory access request with a memory address of said immediately preceding memory access request;
means for describing a path including an arbitrary sequence of sampling points through said group of predefined data values, said path describing means including
means for defining the starting point, ending point shape and sampling step size of said path in response to a user input, and means responsive to said defining means for calculating a memory address of each sampling point;

means, responsive to a user selected interpolation mode, for interpolating a value for one or more sampling point values, when the user selects a nearest neighbor interpolation rule, using the nearest predefined data value for each sampling point, and when a sampling step size is less than or equal to the distance between adjacent predefined data values, said cache memory means is accessed to obtain multiple sampling points, and when said user selects an operating dimension $N(N \geq 1)$, which is less than or equal to M, said interpolation means uses $2^N$ neighboring predefined data values, which are simultaneously accessed from said storing means using the memory address of each sampling point, to determine one or more sampling point values.

28. A method of operating a computing apparatus for determining an arbitrary sequence of data values from a group of predefined data values, comprising the steps of storing said group of predefined data values, arranged in an $M(M \geq 3)$ dimensional Cartesian coordinate system in a storing means, said storing means including a plurality of memory banks which are arranged to store said group of predefined data values such that no predefined data value has a neighboring predefined data value which is stored in a memory bank which is the same as its memory bank, said storing means being so arranged that all of said plurality of memory banks can be accessed simultaneously, said storing step including the steps of saving, in a cache memory means, data values associated with an immediately preceding memory access request and comparing a memory address of a current memory access request with a memory address of said immediately preceding memory access request;

describing a path including an arbitrary sequence of sampling points through said group of predefined data values, including defining the starting point, ending point shape and sampling step size of said path in response to a user input, and calculating a memory address of each sampling point;

in response to a user selected interpolation mode, interpolating a value for one or more sampling point values, when the user selects a nearest neighbor interpolation rule, accessing the nearest predefined data value for each sampling point value, and when a sampling step size is less than or equal to the distance between adjacent predefined data values, accessing said cache memory means to obtain multiple sampling point values, and when said user selects an operating dimension $N(N \geq 1)$, which is less than or equal to M, interpolating the $2^N$ neighboring predefined data values, which are simultaneously accessed from said storing means using the memory address of each sampling point, to determine one or more sampling point values.

* * * * *